(12) United States Patent
Wei et al.

(10) Patent No.: US 12,415,940 B2
(45) Date of Patent: Sep. 16, 2025

(54) HEAT TRANSFER LABELS WITH POLYCHROMATIC EFFECTS

(71) Applicant: Illinois Tool Works Inc., Glenview, IL (US)

(72) Inventors: Huanyu Wei, Wilbraham, MA (US); Carlos G. Altamirano, East Hartford, CT (US); Trinh Truong, Vernon, CT (US)

(73) Assignee: Illinois Tool Works Inc., Glenview, IL (US)

( * ) Notice: Subject to any disclaimer, the term of this patent is extended or adjusted under 35 U.S.C. 154(b) by 1150 days.

(21) Appl. No.: 17/256,464

(22) PCT Filed: Aug. 19, 2019

(86) PCT No.: PCT/US2019/047014
§ 371 (c)(1),
(2) Date: Dec. 28, 2020

(87) PCT Pub. No.: WO2020/041168
PCT Pub. Date: Feb. 27, 2020

(65) Prior Publication Data
US 2021/0179894 A1    Jun. 17, 2021

Related U.S. Application Data

(60) Provisional application No. 62/719,833, filed on Aug. 20, 2018.

(51) Int. Cl.
C09J 7/29    (2018.01)
B44C 1/17    (2006.01)
(Continued)

(52) U.S. Cl.
CPC ............... C09J 7/29 (2018.01); B44C 1/1716 (2013.01); C09J 5/06 (2013.01); C09J 7/35 (2018.01);
(Continued)

(58) Field of Classification Search
CPC ... B44C 1/1716; C09J 7/29; C09J 7/35; C09F 3/0291
(Continued)

(56) References Cited

U.S. PATENT DOCUMENTS 5,919,834 A    7/1999 Downs et al.
9,266,373 B2    2/2016 Carlson et al.
(Continued)

FOREIGN PATENT DOCUMENTS

CN    107111969 A    8/2017
CN    107849407 A    3/2018
(Continued)

OTHER PUBLICATIONS

Yoshimura, Y., Machine-translation to English by Clarivate Analytics of JPH07186597A with full foreign patent attached, Dec. 27, 1993. (Year: 1993).*
(Continued)

*Primary Examiner* — Abbas Rashid
*Assistant Examiner* — Gregory C. Grosso
(74) *Attorney, Agent, or Firm* — Levenfeld Pearlstein, LLC

(57) ABSTRACT

A polychromatic effects heat transfer label includes a carrier and a polychromatic effects design layer on the carrier. The polychromatic effects design layer is formulated from an ink having a polychromatic effects pigment present in a concentration of about 1 percent to about 25 percent by weight of the ink. The polychromatic effects heat transfer label is transferred from the carrier to an apparel item as a poly-
(Continued)

chromatic effects feature and the polychromatic effects feature exhibits robust polychromatic effects on the item. The polychromatic effects feature exhibits no adhesion failure, no color change, no stain, and no visual change after being subjected to a Nike standard embellishment durability wash tests of an accelerated wash, 5 times at a temperature of 60° C. and an innovation standard wash, 15 times at a temperature of 60° C., and being tumbled dry after each wash and exhibits no color transfer, no abrasion and no visual change after being subjected to an AATCC standard crock test, 10 crocks with an SDLATLAS CM-5 AATCC crockmeter and an TIC crockmeter using 2"×2" squares. Polychromatic effects heat transfer labels for transfer to plastic, carbon fiber and metal are disclosed.

6 Claims, 1 Drawing Sheet

(51) Int. Cl.

| | | |
|---|---|---|
| *C09J 5/06* | (2006.01) | |
| *C09J 7/35* | (2018.01) | |
| *C09J 7/40* | (2018.01) | |
| *C09J 11/00* | (2006.01) | |
| *G09F 3/00* | (2006.01) | |
| *G09F 3/04* | (2006.01) | |
| *G09F 3/02* | (2006.01) | |

(52) U.S. Cl.
CPC ............... *C09J 7/405* (2018.01); *C09J 11/00* (2013.01); *G09F 3/0291* (2013.01); *G09F 3/04* (2013.01); *C09J 2203/334* (2013.01); *C09J 2301/16* (2020.08); *C09J 2301/208* (2020.08); *C09J 2301/304* (2020.08); *G09F 2003/0211* (2013.01); *G09F 2003/0282* (2013.01)

(58) Field of Classification Search
USPC .......................................................... 156/230
See application file for complete search history.

(56) References Cited

U.S. PATENT DOCUMENTS

| | | | |
|---|---|---|---|
| 2016/0129718 A1* | 5/2016 | O'Leary | ............ B41M 5/38264 |
| | | | 428/32.8 |
| 2017/0267013 A1 | 9/2017 | Staub et al. | |
| 2019/0073928 A1 | 3/2019 | Wei et al. | |

FOREIGN PATENT DOCUMENTS

| | | | | |
|---|---|---|---|---|
| KR | 20160032820 A | | 3/2016 | |
| WO | WO-2005068209 A1 * | | 7/2005 | .............. B41M 3/12 |
| WO | 2015097616 A1 | | 7/2015 | |
| WO | 2015103098 A1 | | 7/2015 | |

OTHER PUBLICATIONS

Yoshimura, Y. et al., Machine-translation to English of JP-H07186597-A, with full JP-H07186597-A document attached, Dec. 27, 1993. (See NPL Filed On Jan. 24, 2024). (Year: 1993).*
Yoshimura, Y. et al., Machine-translation to English of JP-H07186597-A, with full JP-H07186597-A document attached, Dec. 27, 1993. (Year: 1993).*
"Nike Apparel Lab Test Method Manual", Nike Product Integrity Apparel and Equipment, Rev. # FY16.0, May 12, 2016. *See NPL document filed on Nov. 25, 2024. (Year: 2016).*
International Search Report issued by ISA/EPO in connection with PCT/US2019/047014 on Oct. 25, 2019.
Written Opinion issued by ISA/EPO in connection with PCT/US2019/047014 on Oct. 25, 2019.
International Preliminary Report on Patentability issued by ISA/EPO in connection with PCT/US2019/047014 on Feb. 23, 2021.
"Nike Apparel Lab Test Method Manual, Rev. FY 16.0, effective date May 24, 2016".

* cited by examiner

HEAT TRANSFER LABELS WITH POLYCHROMATIC EFFECTS

This is a National Stage Application of International Patent Application No. PCT/US19/47014, filed Aug. 19, 2019, which claims the benefit of and priority to U.S. Provisional Patent Application Ser. No. 62/719,833, filed Aug. 20, 2018, the entireties of which are incorporated fully herein by reference.

BACKGROUND

Heat transfer labels are well known and used in various industries. For example, heat transfer labels are used to transfer indicia onto fabrics for apparel, commercial products, including cosmetic containers, sports equipment and other substrates. Typically, heat transfer labels include thermoplastic layers capable of being adhered to the substrates upon application of heat and pressure.

Various types of heat transfer labels are known. Some labels are UV curing heat transfer labels and other are solvent-based or water-based thermoplastic ink systems. Examples of UV curing heat transfer labels are disclosed in Downs et al., U.S. Pat. No. 5,919,834, and Colella et al., U.S. Pat. No. 9,266,373, which documents are commonly assigned with the present application and are incorporated in their entirety by reference. Colella et al. discloses a textured heat transfer label.

Heat transfer labels with reflective polychromatic effects are known. Such labels exhibit reflections, similar to sparkles or glitter, of various colors when subject to different light sources. These labels, however, suffer from a number of drawbacks. For example, known, reflective polychromatic effects labels do not exhibit robust reflective polychromatic effects. In addition, there is poor resistance to dye migration, and in order to prevent dye migration from underlying fabrics, dye blockers are typically needed.

Fabrics with such known labels exhibit poor wash-fastness. That is, they commonly cannot withstand standard 60° C. wash tests and maintain the required color effect and robustness. Moreover, some of such labels are solvent based and as such are not environmentally friendly.

Accordingly, there is a need for a label having robust reflective polychromatic effects and features. Desirably, the transfer from such a label maintains robust reflective polychromatic effects. More desirably still, such a label is highly resistant to dye migration and prevents or minimizes dye migration from underlying fabrics, without the use of dye blockers. Still more desirably, a transfer from such a label exhibits good wash-fastness, and can withstand standard 60° C. wash tests and maintain robust reflective polychromatic effects and features. More desirably still, such a heat transfer label is made using water-based inks.

BRIEF SUMMARY

Various embodiments of a heat transfer label with a robust polychromatic effects heat transfer label include a carrier and a polychromatic effects design layer on the carrier. The polychromatic effects design layer is formulated from an ink having a polychromatic effects pigment present in a concentration of about 1 percent to about 25 percent by weight of the ink. The polychromatic effects heat transfer label is transferred from the carrier to an apparel item as a polychromatic effects feature. The polychromatic effects feature exhibits robust polychromatic effects on the apparel item.

The polychromatic effects feature exhibits no adhesion failure, no color change, no stain, and no visual change after being subjected to a Nike standard embellishment durability wash tests of an accelerated wash, 5 times at a temperature of 60° C. and an innovation standard wash, 15 times at a temperature of 60° C., and being tumbled dry after each wash and exhibits no color transfer, no abrasion and no visual change after being subjected to an AATCC standard crock test, 10 crocks with an SDLATLAS CM-5 AATCC crockmeter and an TIC crockmeter using 2"×2" squares.

In an embodiment, the polychromatic effects pigment is present in a concentration of about 6 percent by weight of the ink. The ink can be a water-based ink. Alternatively, the ink can be a solvent-based ink.

The label can include a back-up layer and can include an adhesive layer. In embodiments, the adhesive layer is disposed on the back-up layer.

In an embodiment, the polychromatic effects design layer on the carrier is a first polychromatic effects design layer, and the label includes a second polychromatic effects design layer disposed on the first polychromatic effects design layer.

In an embodiment, the back-up layer is a first back-up layer and the label includes a second back-up layer disposed on the first back-up layer. The adhesive layer can be a first adhesive layer and the label can include a second adhesive layer disposed on the first adhesive layer.

In another aspect, a method of providing a durable polychromatic effects feature to a fabric target object, includes the steps of providing a polychromatic effects heat transfer label that has a carrier and a polychromatic effects design layer on the carrier. The polychromatic effects design layer is formulated from an ink having a polychromatic effects pigment present in a concentration of about 1 percent to about 25 percent by weight of the ink. The label further includes a back-up layer on the polychromatic effects design layer.

The method includes placing the polychromatic effects heat transfer label onto the fabric target object with the polychromatic effects design layer being closer to the target object than the carrier is closer to the fabric target object, applying heat and pressure to a back side of the carrier and separating the polychromatic effects design layer from the carrier to define a polychromatic effects feature and transferring and adhering the polychromatic effects feature to the fabric target object.

The polychromatic effects feature exhibits no adhesion failure, no color change, no stain, and no visual change after being subjected to a Nike standard embellishment durability wash tests of an accelerated wash, 5 times at a temperature of 60° C. and an innovation standard wash, 15 times at a temperature of 60° C., and being tumbled dry after each wash, and exhibits no color transfer, no abrasion and no visual change after being subjected to an AATCC standard crock test, 10 crocks with an SDLATLAS CM-5 AATCC crockmeter and an TIC crockmeter using 2"×2" squares.

In a method, the polychromatic effects pigment is present in a concentration of about 6 percent by weight of the ink. In a method, the label further includes a back-up layer on the polychromatic effects design layer. In methods, the label further includes an adhesive layer on the polychromatic effects design layer and can include an adhesive layer on the back-up layer.

In still another aspect, a method of providing a durable polychromatic effects feature to a plastic target object includes providing a polychromatic effects heat transfer label, which polychromatic effects heat transfer label has a carrier and a polychromatic effects design layer on the carrier. The polychromatic effects design layer is formulated from an ink having a polychromatic effects pigment present in a concentration of about 1 percent to about 25 percent by weight of the ink. The polychromatic effects heat transfer label further includes a back-up layer on the polychromatic effects design layer.

A method includes placing the polychromatic effects heat transfer label onto the plastic target object with the polychromatic effects design layer being closer to the target object than the carrier is closer to the fabric target object and applying heat and pressure to a back side of the carrier.

The method includes separating the polychromatic effects design layer from the carrier to define a polychromatic effects feature and transferring and adhering the polychromatic effects feature to the plastic target object. In such a method, the polychromatic effects feature exhibits no tape adhesion failure, and no noticeable visual change after being subjected to a standard cream resistance test and after being subject to a fingernail scratch resistance test.

In yet another aspect, a method of providing a durable polychromatic effects feature to a metal or carbon fiber target object includes providing a polychromatic effects heat transfer label, which the polychromatic effects heat transfer label has a carrier and a polychromatic effects design layer on the carrier. The polychromatic effects design layer can be formulated from an ink having a polychromatic effects pigment present in a concentration of about 1 percent to about 25 percent by weight of the ink. The polychromatic effects heat transfer label can further include a back-up layer on the polychromatic effects design layer.

The method further includes placing the polychromatic effects heat transfer label onto the plastic target object with the polychromatic effects design layer being closer to the target object than the carrier is closer to the fabric target object and applying heat and pressure to a back side of the carrier Further the method includes separating the polychromatic effects design layer from the carrier to define a polychromatic effects feature and transferring and adhering the polychromatic effects feature to the plastic target object. In such a method, the polychromatic effects feature exhibits no tape adhesion failure, and no noticeable visual change after being subjected to a standard abrasion resistance test and after being subject to a standard solvent resistance test.

Other aspects, objectives and advantages will become more apparent from the following detailed description when taken in conjunction with the accompanying drawings.

BRIEF DESCRIPTION OF THE DRAWINGS

The benefits and advantages of the present embodiments will become more readily apparent to those of ordinary skill in the relevant art after reviewing the following detailed description and accompanying drawings, wherein.

DETAILED DESCRIPTION

Figure 1:
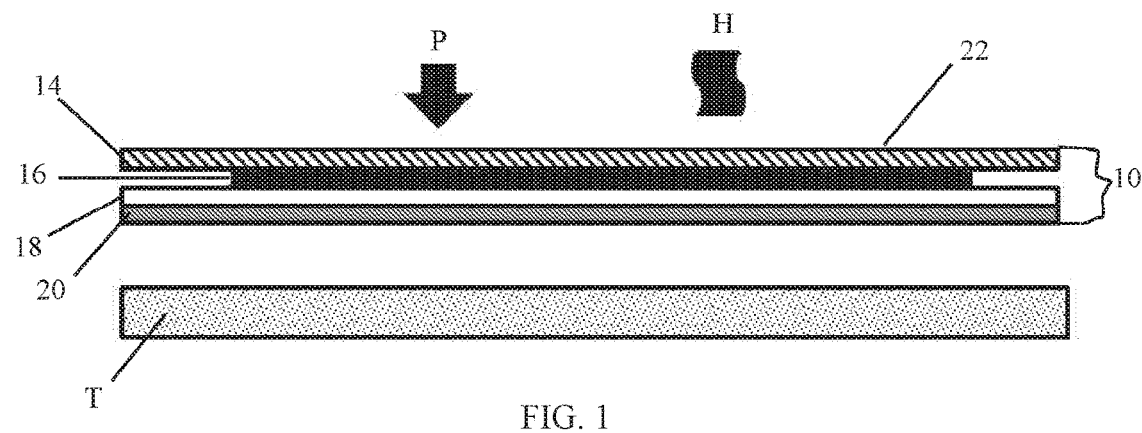
FIG. 1 is a schematic cross sectional view of an embodiment of a heat transfer label having robust reflective polychromatic effects and features according to an embodiment, the label shown prior to application to a target object.

While the present disclosure is susceptible of embodiment in various forms, there is shown in the drawings and will hereinafter be described presently preferred embodiments with the understanding that the present disclosure is to be considered an exemplification and is not intended to limit the disclosure to the specific embodiments illustrated.

Various embodiments of a heat transfer label 10 with robust reflective polychromatic effects and features 12 include a carrier 14 and a reflective polychromatic design layer 16 (referred to herein as the "polychromatic design layer") on the carrier 14. One polychromatic design layer 16 is formulated from a design ink having a water based composition having a polychromatic pigment in a concentration of about 1 percent to about 25 percent, and preferably in a concentration of about 6 percent by weight of the ink. Other inks may be solvent based. The reflective polychromatic effects heat transfer label 10 is transferred from the carrier 14 to an apparel item T as a robust polychromatic feature 12. The reflective polychromatic feature 12 exhibits different colors from different viewing angles, has a reflective or sparking effect on the apparel item T.

Referring now to the figures, FIG. 1 shows a schematic cross sectional view of an embodiment of a reflective polychromatic effects (referred to herein as "polychromatic effects") heat transfer label 10. Layer thicknesses are exaggerated for easy understanding and are not proportional in this embodiment and other embodiments shown in other figures in this disclosure.

Such a robust polychromatic effects heat transfer label 10 provides a strong or robust polychromatic effects feature 12 that exhibits good resistance to dye migration and good wash-fastness when applied to the target object T. It will be appreciated that wash-fastness refers to the ability to wash the target object T, such as an apparel item, and meet certain requirements, as discussed below.

Such a label 10 is also environmentally friendly, having an ink that a water-based formulation. The label 10 exhibits good opacity; nevertheless, one or more back-up layers 18 may be used to "block" the underlying object T color. The label 10 may be used on objects T including, for example, apparel items, cosmetic containers, sports equipment and automotive parts and components.

Figure 2:
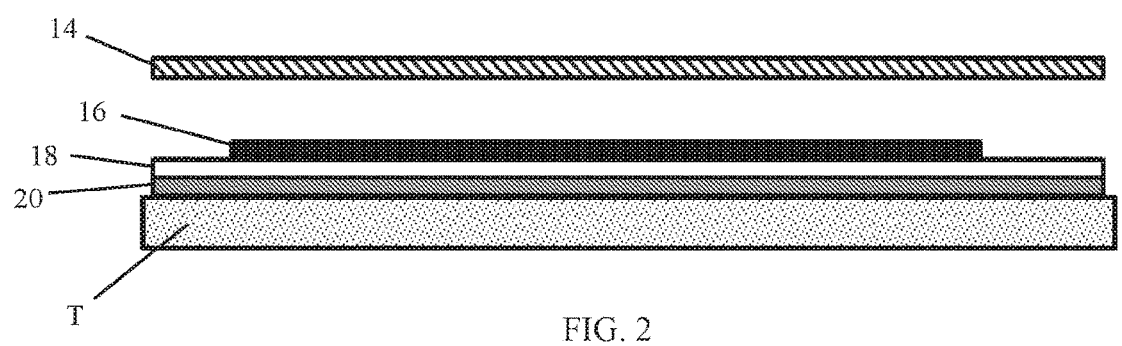
FIG. 2 is a schematic cross sectional view of the label having robust reflective polychromatic effects and features of FIG. 1 applied to a target object.
Figure 3:
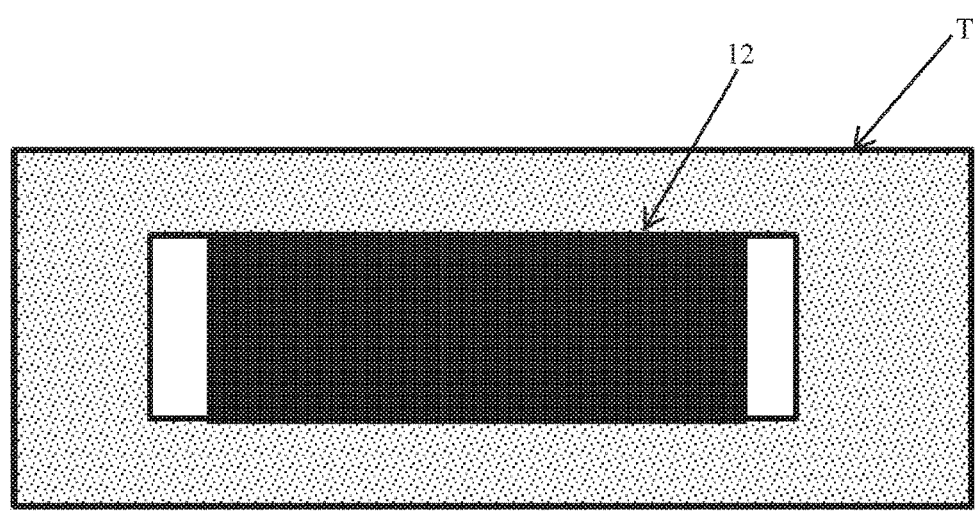
FIG. 3 is an overhead or plan view of an example of the robust reflective polychromatic effects and features heat transfer label of FIGS. 1 and 2 applied to a target object.

The polychromatic effects heat transfer label 10 generally includes the carrier 14, such as a carrier web, and a polychromatic effects design layer 16. The label 10 can include one or more back-up layers 18 and optionally one or more adhesive layers 20. FIGS. 2 and 3 illustrate the label 10 as applied to a target object T in cross-sectional view (FIG. 2), and in plan or bird's eye view (FIG. 3).

The label 10 is configured such that the adhesive layer 20, if needed and the back-up layer 18, if needed, and the polychromatic effects design layer 16 separate from the carrier 14 and transfer and adhere to the target object T, upon application of heat H and pressure P on an outer surface 22 of the carrier 14. When applied on the target object T, the polychromatic effects design layer 16 provides robust reflective polychromatic effects of the transferred design or feature 12 on the target object T. It will be appreciated that although the polychromatic effects design layer 16, the back-up layer 18 is used, and the adhesive layer 20 if used, are each illustrated as single layers, the polychromatic effects design layer 16, the back-up layer 18 and the adhesive layer 20 may each comprise multiple inks and layers.

It will also be appreciated that the polychromatic effects design layer 16 may be formulated to adhere directly to the target object T without a back-up layer 18 and without an adhesive layer 20. That is, the polychromatic effects design layer 16 may not require the back-up layer 18 between it and the adhesive layer 20, again, if needed.

In embodiments, the polychromatic effects design layer 16 is printed onto the carrier 14, and can include a pattern. As an example, a logo can be printed in or as a design that is applied to an area on the carrier 14 that transfers to the target object T as the feature 12. For example, the reflective polychromatic effects design layer 16 can be printed as a logo for which certain design aesthetics are desired.

The carrier 14 can be formed from a wide variety of materials as will be recognized by those skilled in the art. In one embodiment, the carrier 14 is formed as a web from a polyethylene phthalate (PET) film, such as a clear PET film. As will be readily appreciated, one benefit of using a clear material for the carrier 14 is that, if desired, one can inspect the quality of the polychromatic effects design layer 16 by looking at the layer 16 through the carrier 12. Other suitable carrier materials include 92 gauge (92 ga) clear, untreated packaging grade polyester film, polypropylene (PP) films and the like.

The material for the carrier layer 14 is selected such that the surface energy of the carrier 14 is sufficiently high for printing the polychromatic effects design layer 16, but allows the polychromatic effects design layer 16 to be transferred to the target object T upon application of heat H and pressure P.

The adhesive layer 20, if used, is applied over the polychromatic effects design layer 16 or the back-up layer 18, if used. The adhesive layer 20 may be formulated as a water-based adhesive, such as a water-based polyurethane adhesive. Such an adhesive melts or softens upon application of heat and pressure, and adheres to the target object T to attach the polychromatic effects feature 12 to the target object T. Suitable thermoplastic compositions may be formulated with thermoplastic resins and hotmelt powders. Suitable hotmelt powder resins include, but are not limited to, thermoplastic polyurethanes, copolyesters, and copolyamides. In such a thermoplastic composition, the hotmelt powder may be dispersed in thermoplastic resin binder and may have a particle size distribution suitable for the screen mesh being used for printing.

In embodiments, the polychromatic effects design layer 16 is prepared as a water-based ink formulation including the following components:

TABLE 1

| Component | % by weight of the ink |
|---|---|
| CM4481 Versa T Clear | 84.4 |
| MultiFlect ®Wave35 | 6.0 |
| Surfynol PSA336 | 0.5 |
| Water | 9.1 |
| Total | 100.00 |

In an embodiment, a polychromatic effects design layer 16 ink was formulated according to TABLE 1, by adding 6.0 g of a polychromatic pigment, MultiFlect® Wave35, commercially available from SCHLENK AG, of Roth, Germany, into a water based composition of 84.4 g of CM4481 Versa T Clear, commercially available from ITW Graphics, of Manchester CT, 0.5 g of Surfynol PSA336, commercially available from Evonik Industries AG, and 9.1 g of water while mixing.

The above polychromatic effects design layer 16 ink with 1.7% of IFSCT, which is an aziridine crosslinker, commercially available from ITW Graphics is printed on a carrier web 14 of PET film FX 4 mil as first a polychromatic effects design layer 16. The same ink was printed on the first polychromatic effects design layer 16 as a second polychromatic effects design layer 16.

A black ink was printed on top of the polychromatic effects design layer 16 as a first backup layer 18, and the same black ink was printed on top of the first black backup layer 18 as a second back-up layer 18. In an embodiment, the black ink was a water based black ink, Versa Black with 1.7% of IFSCT, which is the aziridine crosslinker disclosed above.

A water based adhesive, such as a water based polyurethane adhesive was printed on top of the back-up layers 18 as a first adhesive layer 20, and a second printing of the adhesive was made on the first adhesive layer 20 as a second adhesive layer 20 to make the heat transfer label 10 with the polychromatic effects. In an embodiment the adhesive was CM4546, which is a water based polyurethane adhesive, commercially available from ITW Graphics.

The heat transfer label 10 with the polychromatic effects was transferred to a fabric T by an INVISTA® flat stamper at conditions of 288° F., 60 psi pressure and 18 sec dwelling time. The fabric T with a heat transferred polychromatic effects design feature 12 was subject to a Nike standard embellishment durability wash tests, Accelerated Wash, 5 washes at 60° C. and Innovation Standard Wash, 15 washes at 60° C., with a Miele PW6065 washing machine and tumbled dry after each wash with an automatic dryer, and successfully passed the tests. No adhesion failure, no color change, no stain, and no visual change were observed with the polychromatic effects feature F.

The fabric T with a polychromatic effects feature 12 was also subject to an AATCC standard crock test, 10 crocks with a SDLATLAS CM-5 AATCC crockmeter and TIC crockmeter 2"×2" squares, and passed the test. No color transfer, abrasion or visual changes were observed, and successfully passed the test. No abrasion and no visual change were observed.

An FC Barcelona sports club shirt (jersey) with blue and red stripes had a polychromatic effects feature 12 transferred thereto from a label 10 and was subject to a standard dye migration test. The label 10 included the web 14, two polychromatic effects design layers 16, two back-up layers 18 and two adhesive layers 20. The samples T were placed under a white fabric and sandwiched between two plexiglass plates in an AATCC standard perspiration tester under 8.15 pounds weight, and aged at 70° C. for 48 hours in an oven, according to Nike standard colorfastness and dye migration for embellishment test method.

The fabric T with the polychromatic effects feature 12 successfully passed the test with a gray scale of 4.5 (4.0 and above is a pass). No dye/color was observed to pass onto the label 10 surface or on to the feature 12, or onto the white fabric on top of the samples T. In the FC Barcelona sports club shirt fabric noted above, the polychromatic effects design feature 12 exhibited good resistance to dye migration.

In embodiments, a polychromatic effects design layer 16 is prepared as a solvent based ink formulation including the following components:

| Component | % by weight of the ink |
|---|---|
| OV427 clear (resin solution) | 91.24 |
| MultiFlect ®Wave35 | 6.00 |
| Dinch | 1.00 |
| Foamex N | 0.30 |
| Disparlon A670-20M | 1.46 |
| Total | 100.00 |

In this formulation, the pigment is present in a concentration of about 6 percent by weight of the design color ink. It has been observed that such a formulation is suitable for, for example, packaging labels for use with plastic cosmetic jars and tubes, and for use with plastic personal care items, such as tooth brushes, razor blade handles and the like.

This design color ink was printed onto a carrier web 14 PET film AB1354 (supplied by ITW Foils of Newburyport, MA), as the polychromatic design layer 16 to make a heat transfer label 10 with polychromatic effects. The polychromatic effects heat transfer feature 12 was transferred to a PETG cosmetic jar T (PET with the addition of glycol, available from CPP Global of Asheboro, NC) or a post-consumer recyclable (PCR) cosmetic jar by using a roller transfer machine available from United Silicone Inc. The black PETG or PCR cosmetic jar T with the heat transferred polychromatic effects feature 12 was subject to a cream resistance test.

A standard brand named skin cream was applied on the feature 12 as transferred to the jar T, and was kept in an oven at 50° C. for 48 hours. The heat transferred polychromatic effects feature 12 on the cosmetic jar T passed the test with no noticeable visual change being observed. The PETG or PCR cosmetic jar T with the heat transferred polychromatic effects feature 12 was also subject to tape adhesion and fingernail scratch resistance testing, and passed these tests with no noticeable difference and defects in the transferred feature 12 following the tests.

In another example of an ink formulation for hard surface applications to, for example, sports equipment such as metal, e.g., steel golf club shafts, the formulation, includes the following components:

| Component | % by weight of the ink |
|---|---|
| 0A433 Clear (resin solution) | 74.49 |
| MultiFlect ®Wave35 | 10.21 |
| Epalloy 5001 | 5.8 |
| Dinch | 1.00 |
| Butyl Lactate | 2.50 |
| Disparlon A670-20M | 1.50 |
| SST-3 | 4.20 |
| Foamex N | 0.30 |
| Total | 100.00 |

In this formulation, the pigment is present in a concentration of about 10.21% by weight. It has been observed that such a formulation is suitable for, for example, heat transfer labels 10 for use with sport equipment, such as metal, e.g., steel golf shafts, arrow shafts and the like.

The above noted formulation with 8.26% by weight OX108, which is a curative agent, commercially available from ITW Graphics was printed onto a carrier web 14 PET film AB1345 (supplied by ITW Foils of Newburyport, MA), as the design color layer 16, backed with OP415 adhesives 20 (supplied by ITW Graphics) to make a heat transfer label 10 with polychromatic effects feature. Polychromatic effects heat transfer features 12 were transferred to a steel golf club shaft T by using a roller transfer machine available from ITW United Silicone. The golf club shafts T were then baked in oven at 150° C. for 12 minutes. The shafts T passed standard tape adhesion, abrasion resistance and acetone and alcohol resistance tests with no noticeable visual change being observed.

Another example of an ink formulation for hard surface applications to, for example, sports equipment such as painted carbon fiber or graphite golf club shafts, includes the following components:

| Component | % by weight of the ink |
|---|---|
| 0V183 Clear (resin solution) | 85.70 |
| MultiFlect ®Wave35 | 6.00 |
| Dinch | 2.00 |
| Butyl Lactate | 5.00 |
| Disparlon A670-20M | 1.00 |
| Foamex N | 0.30 |
| Total | 100.00 |

In this formulation, the pigment is present in a concentration of about 6.00% by weight of the ink formulation. It has been observed that such a formulation is suitable for example, for heat transfer labels 10 for use with sport equipment, such as carbon fiber or graphite golf shafts, arrow shafts and the like.

The above noted formulation was printed onto a carrier web 14 PET film 803, commercially available from Loparex LLC of Iowa City, IA, as the polychromatic effects design layer 16, backed with OV345 adhesive 20 (supplied by ITW Graphics) to make a heat transfer label 10 with polychromatic effects feature. The polychromatic effects heat transfer features 12 were transferred to a painted carbon fiber and a graphite golf club shaft T by using a roller transfer machine available from ITW United Silicone. The golf club shafts T were then clear coated with an automobile grade clear coat. The golf club shafts T passed standard tape adhesion, scratch resistance and solvent resistance tests with no noticeable visual change being observed in the polychromatic effects feature.

Other polychromatic pigment pigments are contemplated. For example, available from SCHLENK AG are MultiFlect® Wave 20 and MultiFlect® Wave 150; From Kolortek, are Holographic Silver KT-HL001-735, KT-HL001-825, KT-HL003-301, KT-HL003-302 and KT-HL105-700. This list is not exhaustive; rather it is an example of some of the polychromatic pigments available and suitable for the present polychromatic heat transfer labels 10. Other pigments will be recognized by those skilled in the art and are within the scope and spirit of the present disclosure. It is anticipated that the concentration of the pigment can be about 0.5 percent to about 50 percent by weight of the design color ink, preferably about 0.5 percent to about 35 percent by weight of the design color ink and more preferably about 1 percent to about 25 percent by weight of the design color ink.

It is to be understood that the particular compositions of the carrier 14, the polychromatic effects design layer 16, the back-up layer 18, if used, and the adhesive layer 20, if used, may vary from the specific compositions disclosed herein depending upon the composition of the target object T to which the label feature 12 is to be applied.

It will also be appreciated that for the sake of simplicity of description, a single polychromatic effects design layer 16, a single back-up layer 18 and a single adhesive layer 20 are illustrated in the figures, but as noted herein, multiples of each of these layers 16, 18, 20 can be used. For example, multiple polychromatic effects design layers 16 can be used to achieve a wide variety of desired visually appealing effects, all of which are within the scope and spirit of the present disclosure.

The words "a" or "an" are to be taken to include both the singular and the plural. Conversely, any reference to plural items shall, where appropriate, include the singular. All patents and published application referred to in this disclosure are incorporated herein in their entirely whether or not expressly done so herein. All percent concentrations disclosed are percent by weight unless otherwise indicated.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

What is claimed is:

1. A polychromatic effects heat transfer label, comprising:
   a polyethylene terephthalate film carrier;
   a polychromatic effects design layer on the carrier, the polychromatic effects design layer formulated from a water-based ink having a polychromatic effects pigment present in a concentration of about 6 percent to about 10 percent by weight of the ink; and
   a back-up layer disposed on the polychromatic effects design layer, and a water-based adhesive layer disposed on the back-up layer opposite the polychromatic effects design layer,
   wherein the polychromatic effects heat transfer label is transferred from the carrier to an apparel item as a polychromatic effects feature, and wherein the polychromatic effects feature exhibits robust polychromatic effect on the apparel item,
   wherein the polychromatic effects feature exhibits no adhesion failure, no color change, no stain, and no visual change after being subjected to a Nike standard embellishment durability wash tests of an accelerated wash, 5 times at a temperature of 60° C. and an innovation standard wash, 15 times at a temperature of 60° C., and being tumbled dry after each wash,
   wherein the polychromatic effects feature exhibits acceptable dye migration resistance in accordance a Nike standard colorfastness and dye migration for embellishment test, and wherein the polychromatic effects feature exhibits no color transfer, no abrasion and no visual change after being subjected to an AATCC standard crock test, 10 crocks with an SDLATLAS CM-5 AATCC crockmeter and an TIC crockmeter using 2"×2" squares, the Nike standard embellishment durability wash tests and Nike standard colorfastness and dye migration for embellishment test, pursuant to Nike Apparel Lab (NAL) Test Method Manual, dated 24 May 2016.

2. The polychromatic effects heat transfer label of claim 1, wherein the polychromatic effects pigment is present in a concentration of about 6 percent by weight of the ink.

3. The polychromatic effects heat transfer label of claim 1, wherein the polychromatic effects design layer on the carrier is a first polychromatic effects design layer, and including a second polychromatic effects design layer disposed on the first polychromatic effects design layer.

4. The polychromatic effects heat transfer label of claim 1, wherein the back-up layer is a first back-up layer and including a second back-up layer disposed on the first back-up layer.

5. The polychromatic effects heat transfer label of claim 1, wherein the adhesive layer is a first adhesive layer and including a second adhesive layer disposed on the first adhesive layer.

6. The polychromatic effects heat transfer label of claim 1, wherein the polychromatic effects design layer on the carrier is a first polychromatic effects design layer, and including a second polychromatic effects design layer disposed on the first polychromatic effects design layer, and further including a first back-up layer disposed on the second polychromatic effects design layer, a second back-up layer disposed on the first back-up layer and an adhesive layer on the second back-up layer.

* * * * *